US012637555B2

(12) United States Patent
Tayeb et al.

(10) Patent No.: US 12,637,555 B2
(45) Date of Patent: May 26, 2026

(54) POLYPROPYLENE COMPOSITION HAVING IMPROVED SCRATCH RESISTANCE PROPERTIES

(71) Applicant: SABIC Global Technologies B.V., Bergen op Zoom (NL)

(72) Inventors: Mohammed Abdulwahab Tayeb, Thuwal (SA); Sahel Alakel, Thuwal (SA); Abdiaziz Farah, Thuwal (SA); Arun Sikder, Bengaluru (IN); Mohammad Abdullah A. Almagweshi, Thuwal (SA)

(73) Assignee: SABIC Global Technologies B.V., Bergen op Zoom (NL)

( * ) Notice: Subject to any disclaimer, the term of this patent is extended or adjusted under 35 U.S.C. 154(b) by 699 days.

(21) Appl. No.: 18/077,345

(22) Filed: Dec. 8, 2022

(65) Prior Publication Data

US 2023/0174760 A1 Jun. 8, 2023

(30) Foreign Application Priority Data

Dec. 8, 2021 (EP) .................................... 21213117

(51) Int. Cl.
*C08L 23/12* (2006.01)

(52) U.S. Cl.
CPC .......... *C08L 23/12* (2013.01); *C08L 2205/03* (2013.01)

(58) Field of Classification Search
CPC ............................ C08L 23/12; C08L 2205/03
See application file for complete search history.

(56) References Cited

U.S. PATENT DOCUMENTS

| | | | |
|---|---|---|---|
| 6,967,225 | B2 | 11/2005 | McEnhill et al. |
| 10,851,235 | B2 | 12/2020 | Vollenberg et al. |
| 2004/0014891 | A1 | 1/2004 | Krabbenborg et al. |
| 2015/0175790 | A1 | 6/2015 | Kim et al. |

FOREIGN PATENT DOCUMENTS

| | | | |
|---|---|---|---|
| CN | 104194156 | B | 9/2016 |
| EP | 0127320 | A1 | 12/1984 |
| EP | 0832925 | A1 | 4/1998 |
| EP | 3039071 | A1 | 7/2016 |

(Continued)

OTHER PUBLICATIONS

Oliver et al. "An improved technique for determining hardness and elastic-modulus using load and displacement sensing indentation experiments", Journal of Materials Research, vol. 7, issue 6, Jun. 1992, Jan. 31, 2011, pp. 1564-1583, 20 Pages.

(Continued)

*Primary Examiner* — Catherine S Branch
*Assistant Examiner* — Andrea Wu
(74) *Attorney, Agent, or Firm* — Conley Rose, P.C.; Rodney B. Carroll

(57) ABSTRACT

The invention is directed to a polypropylene composition having improved scratch resistance properties, wherein the polypropylene composition comprises (i) ≥50.0 wt. % and ≤90.0 wt. % of a propylene polymer, (ii) ≥5.0 wt. % and ≤30.0 wt. % of an elastomeric ethylene alpha-olefin copolymer, and (iii) ≥0.1 wt. % and ≤20.0 wt. % of a poly(siloxane-carbonate) block copolymer, with regard to the total weight of the polypropylene composition. The invention further relates to a process for preparing such polypropylene composition and to an article comprising the polypropylene composition.

20 Claims, 1 Drawing Sheet

(56) References Cited

FOREIGN PATENT DOCUMENTS

| | | | |
|---|---|---|---|
| EP | 3083819 | B1 | 1/2019 |
| KR | 102127349 | B1 | 6/2020 |
| WO | 2007002436 | A1 | 1/2007 |
| WO | 2015028955 | A1 | 3/2015 |
| WO | 2017144475 | A1 | 8/2017 |

OTHER PUBLICATIONS

Arun Kumar Sikder"Effect of tip size and experimental conditions on nano-scale frictiontesting" Proceedings of the Institution of Mechanical Engineers, Part J: Journal of Engineering Tribology, vol. 235, Issue6, Jun. 2021, pp. 1075-1084.

Sikder et al."The splitting tendency of unianxially-oriented PET tapes investigated with nano-identation, non-scratch, differential scanning calorimetry, and Xray" Polym. Eng. Sci. vol. 60, 2685-2701 (2020).

Foreign communication from related application—European Search report dated Jun. 3, 2022 for EP Application No. 21213117.1, filed Dec. 8, 2021, 5 pages.

Foreign communication from related application—International Search Report and Written Opinion on Patentability dated Mar. 6, 2023 for International Application No. PCT/EP2022/083735 filed Nov. 29, 2022, 10 pages.

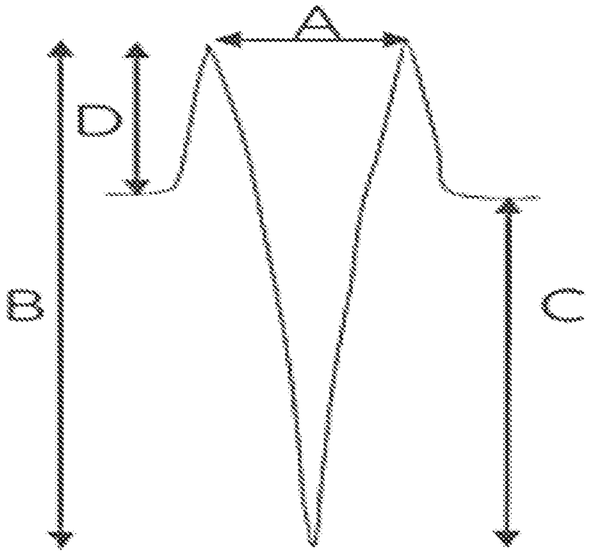
A = Scratch Width
B = Total scratch depth
C = Scratch residual depth
D = Scratch pile up height

POLYPROPYLENE COMPOSITION HAVING IMPROVED SCRATCH RESISTANCE PROPERTIES

CROSS REFERENCE TO RELATED APPLICATIONS

This application claims priority to European Patent Application No. EP21213117.1 filed Dec. 8, 2021 and entitled, "A Polypropylene Composition Having Improved Scratch Resistance Properties," which is incorporated by reference herein in its entirety.

FIELD OF INVENTION

The present invention relates to the field of polypropylene compositions having improved scratch resistance and to a process for preparing such compositions. The invention further relates to an article comprising the polypropylene composition and to a process for preparing such an article. In addition, the invention further relates to the use of the polypropylene composition for improving the scratch resistance properties of articles typically suited for automobiles and consumer goods.

BACKGROUND

Polypropylene (PP) is a polymeric material that is widely used extensively in manufacturing automotive components, consumer electronic appliances and other industrial applications, due to its unique combination of desirable material properties. Such material properties enable polypropylene formulations to be injection molded into various industrial components across a wide spectrum of application segments. However, such polypropylene based industrial components/parts are susceptible to surface damage, affecting its surface aesthetics and limiting its commercial viability. Accordingly, there has been a need to develop scratch resistant polypropylene formulations, which may be used to manufacture injection molded components prepared from such formulations.

In the past, automotive original equipment manufacturers (OEMS), material convertors, and other industry practitioners, have attempted to improve scratch resistance of polypropylene compositions by incorporating fillers/polymer blends into a polypropylene matrix. For example, the U.S. Pat. No. 6,967,225 B2 describes a scratch resistant polypropylene composition having a combination of ethylene vinyl acetate and an aliphatic petroleum resin for imparting the scratch resistance to the polypropylene resin. However, it is often desired to enhance scratch property of polypropylene compounds while balancing mechanical properties of modulus, hardness, and impact strength. In particular, it has been observed by some industry practitioners, that often the mechanical properties of the composition are compromised on account of the presence of additives and fillers, including anti-scratch additives in the polymer matrix.

US patent application US20040014891 describes a process for preparing injection molded articles from polypropylene having both scratch resistance and good impact properties. Although, the technical solutions proposed in this patent application appears promising, there is still a scope to further improve both mechanical as well as scratch resistance properties for polypropylene compositions. Thus, for the foregoing reasons, there remains a need for developing a polypropylene based composition having a combination of excellent scratch resistance while retaining suitable mechanical properties of hardness and modulus.

BRIEF SUMMARY

A solution to some or all of the drawbacks in existing art, resides in the polypropylene composition of the present invention. Preferably, in some embodiments of the invention, the invention is directed to a polypropylene composition, comprising:

- ≥50.0 wt. % and ≤90.0 wt. %, preferably ≥70.0 wt. % and ≤90.0 wt. %, of a propylene polymer;
- ≥5.0 wt. % and ≤30.0 wt. %, preferably ≥5.0 wt. % and ≤20.0 wt. %, of an elastomeric ethylene alpha-olefin co-polymer; and
- ≥0.1 wt. % and ≤20.0 wt. %, preferably ≥0.1 wt. % and ≤5.0 wt. % of a poly(siloxane-carbonate) block copolymer;

with regard to the total weight of the polypropylene composition.

In some embodiments of the invention, the propylene polymer is selected from the group consisting of a propylene homopolymer, a heterophasic propylene copolymer, a blend of at least two different heterophasic propylene copolymer, a grafted propylene polymer, a propylene copolymer comprising units derived from propylene and one or more units derived from ethylene and/or alpha-olefin(s) having 4-12 carbon atoms, and combinations thereof, and wherein preferably the propylene polymer is a blend of at least two different heterophasic propylene copolymer.

In some embodiments of the invention, the propylene polymer is a blend of two different heterophasic propylene copolymer, wherein the blend comprises a first heterophasic propylene copolymer having a first melt flow rate ($MFR_A$) and a second heterophasic propylene copolymer having a second melt flow rate ($MFR_B$), wherein each of the first melt flow rate ($MFR_A$) and the second melt flow rate ($MFR_B$) is determined in accordance with ISO 1133 (2.16 kg and 230° C.), and wherein $MFR_A > MFR_B$.

In some embodiments of the invention, the poly(siloxane-carbonate) block copolymer has a siloxane content of ≥5.0 wt. % and ≤95.0 wt. %, preferably ≥30.0 wt. % and ≤75.0 wt. %, preferably ≥55.0 wt. % and ≤65.0 wt. %, with regard to the total weight of the poly(siloxane-carbonate) block copolymer, preferably the poly(siloxane-carbonate) block copolymer has a siloxane content of 60.0 wt. %, with regard to the total weight of the poly(siloxane-carbonate) block copolymer.

In some embodiments of the invention, the elastomeric ethylene alpha-olefin co-polymer comprises (i) polymeric units derived from ethylene; and (ii) ≥5.0 wt. % and ≤50.0 wt. %, preferably ≥15.0 wt. % and ≤45.0 wt. %, preferably ≥25.0 wt. % and ≤40.0 wt. %, of polymeric units derived from one or more alpha-olefins having 3-12 carbon atoms, with regard to the total weight of the elastomeric ethylene alpha-olefin co-polymer, wherein the alpha-olefins are selected from propylene, 1-butene, 1-hexene, 4-methyl-1-pentene, 1-octene, or combinations thereof, preferably the alpha-olefin is selected from 1-butene, 1-hexene or 1-octene. Preferably, the alpha-olefin is 1-octene.

In some embodiments of the invention, the elastomeric ethylene alpha-olefin co-polymer has at least one of:

- a melt flow rate (MFR) ≥0.5 g/10 min and ≤25.0 g/10 min, preferably ≥1.0 g/10 min and ≤15.0 g/10 min, preferably ≥2.0 g/10 min and ≤8.0 g/10 min, as determined at 190° C. at 2.16 kg load in accordance with ASTM D1238 (2013); and/or a density ≥850 kg/$m^3$ and ≤910 kg/$m^3$, as determined in accordance with ASTM D792 (2008).

In embodiments, the polypropylene composition further comprises one or more filler additives, wherein the one or more filler additives are present in an amount of ≥0.1 wt. % and ≤30.0 wt. %, preferably ≥5.0 wt. % and ≤20.0 wt. %, preferably ≥5.0 wt. % and ≤15.0 wt. %, with regard to the total weight of the polypropylene composition. In embodiments, the one or more filler additives are selected from the group consisting of talc, anti-oxidants, UV stabilizers, color master-batches and combinations thereof. In embodiments, the polypropylene composition further comprises talc, anti-oxidants, UV stabilizers, and color master-batches.

In some embodiments of the invention, the polypropylene composition comprises:

- ≥50.0 wt. % and ≤90.0 wt. %, preferably ≥70.0 wt. % and ≤90.0 wt. %, of the propylene polymer, wherein the propylene polymer is a blend of at least two different heterophasic propylene copolymer;
- ≥5.0 wt. % and ≤30.0 wt. %, preferably ≥5.0 wt. % and ≤20.0 wt. %, of an elastomeric ethylene alpha-olefin co-polymer;
- ≥0.1 wt. % and ≤20.0 wt. %, preferably ≥0.1 wt. % and ≤5.0 wt. % of the poly(siloxane-carbonate) block copolymer having a siloxane content of ≥5.0 wt. % and ≤95.0 wt. %, with regard to the total weight of the poly(siloxane-carbonate) block copolymer; and
- ≥0.1 wt. % and ≤30.0 wt. %, preferably ≥5.0 wt. % and ≤20.0 wt. %, of one or more filler additives;

with regard to the total weight of the polypropylene composition.

In some embodiments of the invention, the polypropylene composition comprises:

- ≥50.0 wt. % and ≤90.0 wt. %, preferably ≥70.0 wt. % and ≤90.0 wt. %, of the propylene polymer, wherein the propylene polymer is a blend of two different heterophasic propylene copolymer comprising a first heterophasic propylene copolymer having a first melt flow rate ($MFR_A$) and a second heterophasic propylene copolymer having a second melt flow rate ($MFR_B$), wherein each of the melt flow rate is determined in accordance with ISO 1133 (2.16 kg and 230° C.), and wherein $MFR_A$>$MFR_B$;
- ≥5.0 wt. % and ≤30.0 wt. %, preferably ≥5.0 wt. % and ≤20.0 wt. %, of an elastomeric ethylene alpha-olefin co-polymer, wherein the elastomeric ethylene alpha-olefin co-polymer comprises (i) polymeric units derived from ethylene; and (ii) ≥5.0 wt. % and ≤45.0 wt. %, preferably ≥15.0 wt. % and ≤40.0 wt. %, preferably ≥25.0 wt. % and ≤40.0 wt. %, of polymeric units derived from one or more alpha-olefins having 3-12 carbon atoms, with regard to the total weight of the elastomeric ethylene alpha-olefin co-polymer;
- ≥0.1 wt. % and ≤20.0 wt. %, preferably ≥0.1 wt. % and ≤5.0 wt. % of the poly(siloxane-carbonate) block copolymer, having a siloxane content of ≥5.0 wt. % and ≤95.0 wt. %, with regard to the total weight of the poly(siloxane-carbonate) block copolymer; and
- ≥0.1 wt. % and ≤30.0 wt. %, preferably ≥5.0 wt. % and ≤20.0 wt. %, of one or more filler additives;

with regard to the total weight of the polypropylene composition.

In some embodiments of the invention, the polypropylene composition has at least one of:

- a scratch depth of ≤3000 nm when determined in accordance with ASTM D7127-20 using an increasing load ramping nano-scratch test at a load between ≥50 μN and ≤120 milli-Newton (mN) across a 500 μm scratch length and measured at 48 milli-Newton (mN); and/or
- a co-efficient of friction of ≤0.4 when determined in accordance with ASTM D7127-20 using an increasing load ramping nano-scratch test at a load between ≥50 μN and ≤120 milli-Newton (mN) across a 500 μm scratch length and at a tip velocity of 10.0 μm/s using a three-sided pyramidal Berkovich diamond indenter having a diameter of 0.05 μm;
- a percentage recovery of ≥70.0%, measured at a scratch depth of 400 μm, when determined in accordance with ASTM D7127-20 using an increasing load ramping nano-scratch test at a load between ≥50 μN and ≤120 milli-Newton (mN) across a 500 μm scratch length and at a tip velocity of 10.0 μm/s using a three-sided pyramidal Berkovich diamond indenter having a diameter of 0.05 μm.

In some embodiments of the invention, the invention is directed to a process for preparing the polypropylene composition of the present invention, wherein the process comprises the steps of:

- providing to an extruder a set of ingredients comprising a propylene polymer, an elastomeric ethylene alpha-olefin co-polymer, a poly(siloxane-carbonate) block copolymer, and optionally one or more filler additives; and
- extruding the set of ingredients at an extrusion temperature of ≥75° C. and ≤350° C., and forming the polypropylene composition.

In some embodiments of the invention, the invention is directed to an article comprising the polypropylene composition of the present invention, preferably the article is an automotive component. In some embodiments of the invention, the invention is directed to a process for preparing the article, wherein the process comprises:

- providing the polypropylene composition of the present invention; and
- molding the polypropylene composition under conditions suitable for injection molding and forming the article.

In some embodiments of the invention, the invention is directed to the use of the polypropylene composition of the present invention for improving the scratch resistance property of an article.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which:

The FIGURE illustrates a schematic diagram representing the different parameters used for evaluating scratch resistance of a sample.

DETAILED DESCRIPTION OF THE INVENTION

The following includes definitions of various terms and phrases used throughout this specification.

Any numerical range used throughout this disclosure shall include all values and ranges there between unless specified otherwise. For example, a boiling point range of 50° C. to 100° C. includes all temperatures and ranges between 50° C. and 100° C. including the temperature of 50° C. and 100° C.

The use of the words "a" or "an" when used in conjunction with the term "comprising," "including," "containing," or "having" in the claims or the specification may mean "one," but it is also consistent with the meaning of "one or more," "at least one," and "one or more than one." The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The process of the present invention can "comprise", "consist essentially of," or "consist of" particular ingredients, components, compositions, etc., disclosed throughout the disclosure.

The invention addresses the need for developing polypropylene compositions having excellent scratch resistance while retaining the desired mechanical properties of hardness and modulus. These technical features are achieved in part, by the polypropylene composition of the present invention.

In particular, the polypropylene composition of the present invention, comprises:

- ≥50.0 wt. % and ≤90.0 wt. %, preferably ≥70.0 wt. % and ≤90.0 wt. %, of a propylene polymer;
- ≥5.0 wt. % and ≤30.0 wt. %, preferably ≥5.0 wt. % and ≤20.0 wt. %, of an elastomeric ethylene alpha-olefin co-polymer; and
- ≥0.1 wt. % and ≤20.0 wt. %, preferably ≥0.1 wt. % and ≤5.0 wt. % of a poly(siloxane-carbonate) block copolymer;

with regard to the total weight of the polypropylene composition.

A suitable class of propylene polymer may be chosen for the purposes of the invention. For example the propylene polymer is selected from the group consisting of a propylene homopolymer, a heterophasic propylene copolymer, a blend of at least two different heterophasic propylene copolymer, a grafted propylene polymer, a propylene copolymer comprising units derived from propylene and one or more units derived from ethylene and/or alpha-olefin(s) having 4-12 carbon atoms, and combinations thereof, preferably the propylene polymer is a blend of at least two different heterophasic propylene copolymer. Preferably, the propylene copolymer comprises units derived from propylene and units derived from ethylene.

Preferably, the propylene polymer may be a blend of two different heterophasic propylene copolymer, wherein the blend comprises a first heterophasic propylene copolymer having a first melt flow rate ($MFR_A$) and a second heterophasic propylene copolymer having a second melt flow rate ($MFR_B$), wherein each of the first melt flow rate ($MFR_A$) and the second melt flow rate ($MFR_B$) is determined in accordance with ISO 1133 (2.16 kg and 230° C.), and wherein $MFR_A > MFR_B$.

Preferably, the first heterophasic propylene copolymer has a first melt flow rate ($MFR_A$) of ≥25.0 and ≤55.0, preferably ≥30.0 and ≤45.0, when determined in accordance with ISO 1133 (2.16 kg and 230° C.). Preferably, the second heterophasic propylene copolymer has a second melt flow rate ($MFR_B$) of ≥5.0 and ≤20.0, preferably ≥10.0 and ≤15.0, when determined in accordance with ISO 1133 (2.16 kg and 230° C.).

Preferably, the propylene polymer is a blend comprising:

- ≥75.0 wt. % and ≤99.0 wt. %, preferably ≥80.0 wt. % and ≤90.0 wt. %, of the first heterophasic propylene copolymer; and
- ≥1.0 wt. % and ≤25.0 wt. %, preferably ≥10.0 wt. % and ≤20.0 wt. %, of the second heterophasic propylene copolymer;

with regard to the total weight of the propylene polymer.

In a preferred embodiment of the invention, the propylene polymer comprises:

- 83.0 wt. %, of the first heterophasic propylene copolymer; and
- 17.0 wt. %, of the second heterophasic propylene copolymer;

with regard to the total weight of the propylene polymer.

The term heterophasic propylene copolymer is known in the art. A heterophasic propylene copolymer has at least a two-phase structure, comprising (i) a propylene-based (semi-crystalline) matrix referred to as the matrix phase, and (ii) an ethylene-alpha-olefin copolymer dispersed in the matrix and referred to as a dispersed rubber phase. The granted patent EP3083819B1, incorporated herein as a reference provides a general description as to how heterophasic propylene copolymers may be prepared. Heterophasic propylene copolymers are generally prepared in a series of reactors, by the polymerization of propylene in the presence of a catalyst system, and subsequent polymerization of the propylene-alpha-olefin mixture to form a heterophasic propylene copolymer. Alternatively, heterophasic propylene copolymers are prepared by blending two or more different (co)polymers.

Preferably, the first heterophasic propylene copolymer, comprises

- a first matrix phase comprising of a first propylene polymer wherein the first propylene polymer is present in an amount of ≥75.0 wt. % and ≤90.0 wt. %, preferably ≥80.0 wt. % and ≤88.0 wt. %, with regard to the total weight of the first heterophasic propylene copolymer; and
- a first dispersant phase comprising a first ethylene-alpha-olefin copolymer, wherein the first ethylene-alpha-olefin copolymer is present in an amount of ≥10.0 wt. % and ≤25.0 wt. %, preferably ≥12.0 wt. % and ≤20.0 wt. %, with regard to the total weight of the first heterophasic propylene copolymer.

Preferably, the first propylene polymer is selected from propylene homopolymer or a propylene-ethylene random copolymers. Preferably the first propylene polymer is a propylene homopolymer. In other words, the first matrix phase comprises a propylene homopolymer.

Preferably the first ethylene-alpha-olefin copolymer is an ethylene-propylene copolymer. In other words, the first dispersant phase preferably comprises an ethylene-propylene copolymer (C2/C3 copolymer). Preferably, the first ethylene-alpha-olefin copolymer comprises of ≥50.0 wt. % and ≤70.0 wt. %, preferably ≥55.0 wt. % and ≤65.0 wt. %, with regard to the total weight of the first ethylene-alpha-olefin copolymer, of polymeric units derived from ethylene.

Preferably, the first propylene polymer has a melt flow rate (MFR) of ≥55.0 and ≤85.0, preferably ≥60.0 and ≤70.0, when determined in accordance with ISO 1133 (2.16 kg and 230° C.). Preferably, the first ethylene-alpha-olefin copolymer has a melt flow rate (MFR) of ≥2.0 and ≤5.0, preferably ≥2.5 and ≤4.0, when determined in accordance with ISO 1133 (2.16 kg and 230° C.).

Preferably, the second heterophasic propylene copolymer, comprises

- a second matrix phase comprising of a second propylene polymer wherein the second propylene polymer is present in an amount of ≥65.0 wt. % and ≤75.0 wt. %, preferably ≥65.0 wt. % and ≤70.0 wt. %, with regard to the total weight of the second heterophasic propylene copolymer; and
- a second dispersant phase comprising a second ethylene-alpha-olefin copolymer, wherein the second ethylene-alpha-olefin copolymer is present in an amount of ≥25.0 wt. % and ≤35.0 wt. %, preferably ≥25.0 wt. % and ≤30.0 wt. %, with regard to the total weight of the second heterophasic propylene copolymer.

Preferably, the second propylene polymer is selected from propylene homopolymer or a propylene-ethylene random copolymers. Preferably the second propylene polymer is a propylene homopolymer. In other words, the second matrix phase comprises a propylene homopolymer.

Preferably the second ethylene-alpha-olefin copolymer is an ethylene-propylene copolymer. In other words, the second dispersant phase preferably comprises an ethylene-propylene copolymer (C2/C3 copolymer).

Preferably, the second ethylene-alpha-olefin copolymer comprises ≥25.0 wt. % and ≤50.0 wt. %, preferably ≥25.0 wt. % and ≤40.0 wt. %, with regard to the total weight of the second ethylene-alpha-olefin copolymer, of polymeric units derived from ethylene. The polymeric units derived from ethylene and the alpha-olefin may for example be determined via $^{13}C$ NMR spectrometry according to the method presented in JAPS, Vol. 42, pp. 399-408, 1991.

Preferably, the second propylene polymer has a melt flow rate (MFR) of ≥50.0 and ≤100.0, preferably ≥60.0 and ≤85.0, when determined in accordance with ISO 1133 (2.16 kg and 230° C.). Preferably, the second ethylene-alpha-olefin copolymer has a melt flow rate (MFR) of ≥0.05 and ≤0.3, preferably ≥0.1 and ≤0.2, when determined in accordance with ISO 1133 (2.16 kg and 230° C.).

The propylene composition of the present invention has a suitable anti-scratch additive in the composition. For example, the anti-scratch additive may be a poly(siloxane-carbonate) block copolymer having a specific siloxane content. In some embodiments of the invention, the poly(siloxane-carbonate) block copolymer has a siloxane content of ≥5.0 wt. % and ≤95.0 wt. %, preferably ≥30.0 wt. % and ≤75.0 wt. %, preferably ≥55.0 wt. % and ≤65.0 wt. %, preferably the poly(siloxane-carbonate) block copolymer has a siloxane content of 60 wt. %, with regard to the total weight of the poly(siloxane-carbonate) block copolymer. Without wishing to be bound by any specific theory, it is believed that the siloxane content is purposefully selected to impart the desired impact and scratch resistance property to the polypropylene composition of the present invention while ensuring minimal drawbacks associated with surface migration of the siloxane units.

In some embodiments of the invention, the poly(siloxane-carbonate) block copolymer is represented by the formula (Formula I) provided below:

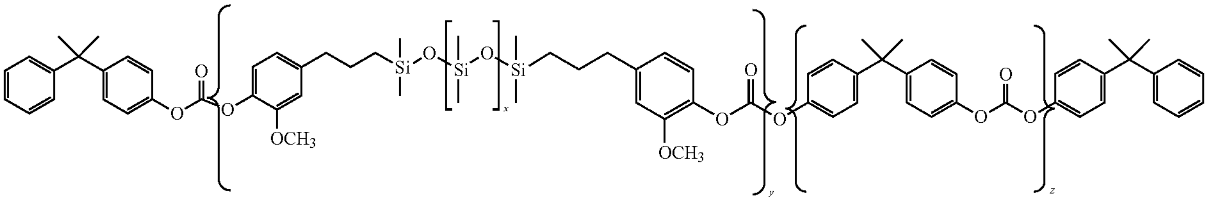

For Formula I, the variable 'x' represents an integer ranging from 10 to 120, 'y' and 'z' are variables indicating repeating block units and can have any integer value such that the siloxane content of the polysiloxane-polycarbonate of the general formula ranges from 5 wt. % to 95 wt. % with regard to the total weight of the poly(siloxane-carbonate) block copolymer.

In some embodiments of the invention, the elastomeric ethylene alpha-olefin co-polymer comprises (i) polymeric units derived from ethylene; and (ii) ≥5.0 wt. % and ≤50.0 wt. %, preferably ≥15.0 wt. % and ≤45.0 wt. %, preferably ≥25.0 wt. % and ≤40.0 wt. %, of polymeric units derived from one or more alpha-olefins having 3-12 carbon atoms, with regard to the total weight of the elastomeric ethylene alpha-olefin co-polymer, wherein the alpha-olefins are selected from propylene, 1-butene, 1-hexene, 4-methyl-1-pentene, 1-octene, or combinations thereof, preferably the alpha-olefin is selected from 1-butene, 1-hexene or 1-octene. Preferably, the alpha-olefin is derived from 1-octene.

In some embodiments of the invention, the elastomeric ethylene alpha-olefin co-polymer has at least one of:

- a melt flow rate (MFR) ≥0.5 g/10 min and ≤25.0 g/10 min, preferably ≥1.0 g/10 min and ≤15.0 g/10 min, preferably ≥2.0 g/10 min and ≤8.0 g/10 min, as determined at 190° C. at 2.16 kg load in accordance with ASTM D1238 (2013); and/or
- a density ≥850 kg/$m^3$ and ≤910 kg/$m^3$, as determined in accordance with ASTM D792 (2008).

Preferably, the elastomeric ethylene alpha-olefin co-polymer has:

- a melt flow rate (MFR) ≥0.5 g/10 min and ≤25.0 g/10 min, preferably ≥1.0 g/10 min and ≤15.0 g/10 min, preferably ≥2.0 g/10 min and ≤8.0 g/10 min, as determined at 190° C. at 2.16 kg load in accordance with ASTM D1238 (2013); and
- a density ≥850 kg/$m^3$ and ≤910 kg/$m^3$, as determined in accordance with ASTM D792 (2008).

Preferably, the elastomeric ethylene alpha-olefin co-polymer has a flexural modulus (1% Secant) of ≥5.0 MPa and ≤15.0 MPa, when determined in accordance with ASTM D790 A.

In some embodiments of the invention, the polypropylene composition further comprises one or more filler additives, wherein the one or more filler additives is present in an amount of ≥0.1 wt. % and ≤30.0 wt. %, preferably ≥5.0 wt. % and ≤20.0 wt. %, preferably ≥5.0 wt. % and ≤15.0 wt. %, with regard to the total weight of the polypropylene composition. Preferably in some embodiments of the invention, the one or more filler additives is selected from the group consisting of talc, anti-oxidants, UV stabilizers, color masterbatches and combinations thereof. Preferably the filler additives comprise talc, a combination of two or more anti-oxidants and a color masterbatch.

Preferably, talc may be present in an amount of ≥0.1 wt. % and ≤30.0 wt. %, preferably ≥5.0 wt. % and ≤20.0 wt. %, with regard to the total weight of the polypropylene composition. Preferably, anti-oxidant may be present in an amount of ≥0.1 wt. % and ≤30.0 wt. %, preferably of ≥0.1 wt. % and ≤2.0 wt. %, preferably of ≥0.2 wt. % and ≤1.0 wt. %, with regard to the total weight of the polypropylene composition. Preferably, color masterbatch may be present in an amount of ≥0.1 wt. % and ≤30.0 wt. %, preferably of ≥0.1 wt. % and ≤5.0 wt. %, preferably of ≥0.2 wt. % and ≤2.0 wt. %, with regard to the total weight of the polypropylene composition.

In some embodiments of the invention, the polypropylene composition comprises:

- ≥50.0 wt. % and ≤90.0 wt. %, preferably ≥70.0 wt. % and ≤90.0 wt. %, of the propylene polymer, wherein the propylene polymer is a blend of at least two different heterophasic propylene copolymer;
- ≥5.0 wt. % and ≤30.0 wt. %, preferably ≥5.0 wt. % and ≤20.0 wt. %, of an elastomeric ethylene alpha-olefin co-polymer;
- ≥0.1 wt. % and ≤20.0 wt. %, preferably ≥0.1 wt. % and ≤5.0 wt. % of the poly(siloxane-carbonate) block copolymer having a siloxane content of ≥10.0 wt. % and ≤80.0 wt. %, with regard to the total weight of the poly(siloxane-carbonate) block copolymer; and
- ≥0.1 wt. % and ≤30.0 wt. %, preferably ≥5.0 wt. % and ≤20.0 wt. %, of one or more filler additives;

with regard to the total weight of the polypropylene composition.

In some embodiments of the invention, the polypropylene composition comprises:

- ≥50.0 wt. % and ≤90.0 wt. %, preferably ≥70.0 wt. % and ≤90.0 wt. %, of the propylene polymer, wherein the propylene polymer is a blend of
  - ≥75.0 wt. % and ≤99.0 wt. %, preferably ≥80.0 wt. % and ≤90.0 wt. %, of the first heterophasic propylene copolymer; and
  - ≥1.0 wt. % and ≤25.0 wt. %, preferably ≥10.0 wt. % and ≤20.0 wt. %, of the second heterophasic propylene copolymer;
  - with regard to the total weight of the propylene polymer;
  - wherein the first heterophasic propylene copolymer has a melt flow rate ($MFR_A$) of ≥25.0 and ≤55.0, preferably ≥30.0 and ≤45.0, when determined in accordance with ISO 1133 (2.16 kg and 230° C.) and wherein the second heterophasic propylene copolymer has a melt flow rate ($MFR_B$) of ≥5.0 and ≤20.0, preferably ≥10.0 and ≤15.0, when determined in accordance with ISO 1133 (2.16 kg and 230° C.);
- ≥5.0 wt. % and ≤30.0 wt. %, preferably ≥5.0 wt. % and ≤20.0 wt. %, of an elastomeric ethylene alpha-olefin co-polymer;
- ≥0.1 wt. % and ≤20.0 wt. %, preferably ≥0.1 wt. % and ≤5.0 wt. % of the poly(siloxane-carbonate) block copolymer having a siloxane content of ≥10.0 wt. % and ≤80.0 wt. %, with regard to the total weight of the poly(siloxane-carbonate) block copolymer; and
- ≥0.1 wt. % and ≤30.0 wt. %, preferably ≥5.0 wt. % and ≤20.0 wt. %, of one or more filler additives;

with regard to the total weight of the polypropylene composition.

The polypropylene composition of the present invention has excellent anti-scratch properties as measured using the anti-scratch test in accordance with the method outlined in ASTM D7127-20. For example, scratch resistance of a material may be evaluated by determining any of the parameters of scratch depth, co-efficient of friction (COF), pile up height or by the percentage of recovery. FIG. 1, provides a schematic details of the different parameters, which may be used to evaluate the scratch resistance properties of a material. From FIG. 1, it is evident that a lower value of scratch depth, scratch pile-up height, and co-efficient of friction indicates a composition having improved or desired anti-scratch property. Similarly, a high percentage of recovery is also indicative of improved scratch resistance. The details related to the scratch resistance measurement has been previously described by Sikder et. al in the publication "*Polym. Eng. Sci. Vol* 60, 2685-2701 (2020)" and incorporated herein as a general reference.

Coefficient of friction (CoF) during scratch testing may be calculated as a function of tip position along the scratch. This may be accomplished by applying a normal load in a controlled fashion while measuring the force required to move the tip laterally across the sample. The friction coefficient μ is defined as $$\mu = \text{Friction force Normal Load/Normal Load}$$

The details of the frictional force determination has been previously described by Sikder et. al in the publication "*Proceedings of the Institution of Mechanical Engineers, Part J. Journal of Engineering Tribology*, Vol 235, 1075-84 (2021)" and incorporated herein as a general reference. The percentage of recovery can be determined during a scratch test using the formula $$\text{Percentage of recovery (\%)} = (\text{Depth1} - \text{Depth2}/\text{Depth1}) \times 100$$

Wherein Depth1 is the depth of scratch recorded during the scratch with an increasing load, and Depth2 is the residual depth of scratch measured during post profile measurement. In this method, post profile measurement is immediate (~1 min after the scratch). Recovery of scratch depth is a combination of elastic and visco-elastic/plastic recovery. For the purposes of the present invention, the scratch depth may be measured at any suitable scratch depth, for example 400 μm.

Accordingly, in some embodiments of the invention, the polypropylene composition has at least one of:

- a scratch depth of ≥200 nm and ≤3000 nm, ≥1000 nm and ≤2800 nm when determined in accordance with ASTM D7127-20 using an increasing load ramping nano-scratch test at a load between ≥50 μN and ≤120 milli-Newton (mN) across a 500 μm scratch length and measured at 48 milli-Newton (mN); and/or
- a coefficient of friction of ≥0.01 and ≤0.4 when determined in accordance with ASTM D7127-20 using an increasing load ramping nano-scratch test at a load between ≥50 μN and ≤120 milli-Newton (mN) across a 500 μm scratch length and at a tip velocity of 10.0 μm/s using a three-sided pyramidal Berkovich diamond indenter having a diameter of 0.05 μm; and/or a percentage of recovery of ≥70.0% and ≤90.0%, measured at a scratch depth of 400 μm, when determined in accordance with ASTM D7127-20 using an increasing load ramping nano-scratch test at a load between ≥50 μN and ≤120 milli-Newton (mN) across a 500 μm scratch length and at a tip velocity of 10.0 μm/s using a three-sided pyramidal Berkovich diamond indenter having a diameter of 0.05 μm.

The inventors found that the polypropylene composition of the present invention was able to retain the desired hardness and modulus properties while having excellent anti-scratch properties. Preferably, the polypropylene composition of the present invention has a nano-indentation modulus of ≥680 MPa and ≤900 MPa, preferably ≥700 MPa and ≤750 MPa when determined in accordance with ISO 14577 (2015). Preferably, the polypropylene composition of the present invention has a nano-indentation hardness of ≥25.0 MPa and ≤50.0 MPa, preferably ≥27.0 MPa and ≤40.0 MPa when determined in accordance with ISO 14577 (2015).

In some embodiments of the invention, the invention is directed to a process for preparing the polypropylene composition of the present invention, wherein the process comprises the steps of:

providing to an extruder a set of ingredients comprising a propylene polymer, an elastomeric ethylene alpha-olefin co-polymer, a poly(siloxane-carbonate) block copolymer, and optionally one or more filler additives; and extruding the set of ingredients at an extrusion temperature of ≥75° C. and ≤350° C., and forming the polypropylene composition.

The polypropylene once obtained may be sent to a cutter to pelletize the polypropylene composition to a desired shape and size prior to molding. Optionally, the pellets once obtained may be sent to a vertical injection-molding unit to form molded articles. The injection molding unit may comprise a cylinder section operated at any temperature ranging between 150° C.-300° C., and a mold section operated at any temperature ranging between 20° C.-100° C. The filling pressure may be maintained between 500-900 bars, while the holding pressure may be maintained between 50-200 bars. During the injection molding process, the filling and the holding time may be maintained at any time period between 1-50 seconds.

In some embodiments of the invention, the invention is directed to an article comprising the polypropylene composition of the present invention, preferably the article is an automotive component. In some embodiments of the invention, the invention is directed to a process for preparing the article, wherein the process comprises:

providing the polypropylene composition of the present invention; and molding the polypropylene composition under conditions suitable for injection molding and forming the article.

In some embodiments of the invention, the invention is directed to the use of the polypropylene composition of the present invention for improving the scratch resistance property of an article. In some embodiments of the invention, the article comprises ≥95.0%, preferably ≥96.0%, preferably ≥98.0%, with regard to the total weight of the article. Non-limiting examples of articles may be automotive samples of quadrant panels, dashboards, automobile cockpits, mobile phones, appliances, home furnishing, building construction.

Specific examples demonstrating some of the embodiments of the invention are included below. The examples are for illustrative purposes only and are not intended to limit the invention. It should be understood that the embodiments and the aspects disclosed herein are not mutually exclusive and such aspects and embodiments can be combined in any way. Those of ordinary skill in the art will readily recognize parameters that can be changed or modified to yield essentially the same results.

Example I

Purpose: To evaluate the scratch resistance and mechanical properties of an inventive polypropylene composition (IE) having a composition in accordance with an embodiment of the present invention and to evaluate its properties with that of the properties of the comparative polypropylene samples CE1 and CE2.

Material: The following materials are used for preparing the samples:

TABLE 1

Material Details

| Material Component | Material details |
|---|---|
| Propylene polymer | Blend of two heterophasic polypropylene copolymer:<br>(i) 83.0 wt. % of First Heterophasic polypropylene copolymer<br>(ii) 17.0 wt. % of Second Heterophasic polypropylene copolymer |
| First Heterophasic polypropylene copolymer | Heterophasic propylene copolymer having of a propylene homopolymer matrix phase and a C2/C3 copolymer disperse phase and having:<br>a) C2 content in disperse phase: 55.0 wt. %<br>b) MFR matrix phase: 75.0 g/10 min, using ISO 1133 (2.16 kg and 230° C.)<br>c) MFR dispersed phase: 3.0 g/10 min, using ISO 1133 (2.16 kg and 230° C.)<br>d) Overall MFR (MFRa): 40.0 g/10 min, using ISO 1133 (2.16 kg and 230° C.) |
| Second Heterophasic polypropylene copolymer | Heterophasic propylene copolymer having of a propylene homopolymer matrix phase and a C2/C3 copolymer disperse phase and having:<br>a) C2 content in disperse phase: 30.0 wt. %<br>b) MFR matrix phase: 75.0 g/10 min, using ISO 1133 |

TABLE 1-continued

| Material Details | |
|---|---|
| Material Component | Material details |
| | (2.16 kg and 230° C.)<br>c) MFR dispersed phase: 0.15 g/10 min, using ISO 1133 (2.16 kg and 230° C.)<br>d) Overall MFR (MFRb): 12.0 g/10 min, using ISO 1133 (2.16 kg and 230° C.) |
| Elastomeric ethylene alpha-olefin co-polymer | SABIC ® FORTIFY ™ C5070: an ethylene octene copolymer. |
| Anti-scratch additive (for IE) | Poly(siloxane-carbonate) block copolymer (FXL-60) from SABIC |
| Anti-scratch additive (for CE1) | MB50-002 (Siloxane Masterbatch Additives-Ultra-high molecular weight siloxane polymer, dispersed in low density polyethylene) from DOW CORNING ®. |
| Filler additives | Anti-oxidants-Combination of Irgafos ® 168, Irganox ® 1010 by BASF |
| Filler additives | Talc: HTP Ultra 5c, commercially available from Imifabi Talc. |
| Filler additives | Color Masterbatch from Clariant with 60% LDPE as carrier |

Material: The following material was used:

TABLE 2

| Composition Details | | | |
|---|---|---|---|
| Composition content | IE (Inventive) | CE1 (Comparative) | CE2 (Comparative) |
| Propylene polymer | 71.6 wt. % | 71.6 wt. % | 72.6 wt. % |
| Elastomeric ethylene alpha-olefinco-polymer | 10.0 wt. % | 10.0 wt. % | 10.0 wt. % |
| Anti-scratch additive | 1.0 wt. % (FXL-60) | 1.0 wt. % (MB- 50) | None |
| Filler additives | 15 wt. % talc | 15 wt. % talc | 15 wt. % talc |
| Filler additives | 0.4 wt. % anti-oxidants | 0.4 wt. % stabilization package | 0.4 wt. % stabilization package |
| Filler additives | 2.0 wt. % color masterbatch | 2.0 wt. % color masterbatch | 2.0 wt. % color masterbatch |

Preparation of Samples: The inventive sample IE was prepared as described: a set of ingredients comprising i) a propylene polymer, comprising a blend of Heterophasic Polypropylene A and Heterophasic Polypropylene B, ii) an elastomeric ethylene alpha-olefin co-polymer, iii) the filler additives and iv) the anti-scratch additive were physically blended together. The anti-scratch additive was added to the propylene mixture in a liquid form. Once the material was thoroughly mixed, the mixture was introduced into an extruder and subsequently subjected to an extrusion temperature in the range between 150° C. and 300° C. with a target die temperature of 230'° C. The screw rotation speed was retained between 10 RPM and 300 RPM, to form the polypropylene composition (IE). The polypropylene composition (IE) was subsequently dried and cooled using water.

In particular, the process of extrusion involved compounding of formulations conducted on a ThermoScientific Process 11 (P11) twin-screw, co-rotating extruder with a default manufacturer polyolefin screws. The extruder that was used intended for small-scale experiments with a throughput ranging from 20 g-2.5 kg/h and a maximum screw speed of 1000 rpm. The extruder has a barrel of 11 mm in diameter with flighted length over outside diameter ratio (LID) of 40. The barrel was segmented into 8 temperature-controlled zones starting after the feeding zone with zone 2 through 8 and ending with the die zone. Zone 2 was set at 180° C. with a gradual increase to 230° C. at the die. Formulations were prepared and mixed manually in a plastic vial then transferred to the pellet feeder. Feeder was put at a setting of 5, and RPM of the screw was set at 50 to generate a stable torque value. The throughput was estimated (depending on formulation) to be around 60-120 g/h at the aforementioned settings of feeder and RPM. Torque values were kept consistent at around 15-20%, depending on formulation.

After extrusion, the polypropylene composition was sent to a cutter, which pelletized the composition, to form pellets of desired shapes and sizes. Subsequently the pellets were sent to a vertical injection-molding unit, comprising a cylinder section operated at any temperature ranging between 150° C.-300° C., and a mold section operated at any temperature ranging between 20° C.-100° C. The filling pressure was maintained between 500-900 bars, while holding pressure was maintained between 50-200 bars. During the injection molding process, the filling and the holding time was maintained at any time period between 1-50 seconds. The injection-molding process resulted in molded samples or articles which were further used for anti-scratch tests and nano-indentation modulus and hardness tests.

Anti-scratch test: The purpose of the anti-scratch evaluation was used to determine (i) the total scratch depth (nm), (ii) the pile up height (nm), (iii) percentage of recovery, and (iv) the coefficient of friction (COF). The anti-scratch test was conducted in accordance with ASTM D7127-20 using an increasing load ramping nano-scratch test at a maximum load of 120 milli-Newton (mN) and a measured at 48 milli-Newton (mN). Nano-scratch experiments were conducted using the Nano Indenter® XP (KLA Corporation, Milpitas, USA). A three-sided pyramidal Berkovich diamond indenter was used to perform scratch testing. A typical scratch experiment was performed in four stages; an original profile, a scratch segment, a residual profile and a cross profile. The scratch velocity was maintained at 10 μm/s while scratch length was 500 μm. The tip end diameter of 0.05 μm was used for the purposes of the present invention.

During the original profile experimentation, the surface morphology was obtained by pre-profiling the surface with 50 μN load at specific location where the scratch evaluation was to be performed. Subsequently, the indenter (three-sided pyramidal Berkovich diamond indenter) was positioned back to its initial location and the scratch experiment was initiated by increasing the normal load from 50 μN to 120 mN. The post scratch profile experimentation was performed along the same path with a 50 μN load to measure the residual deformation in the groove while the cross profile experimentation was performed at a predetermined location (at 48 mN load for this experiment) to evaluate scratch depth, pile up height and scratch recovery (% recovery).

Coefficient of friction (CoF) during scratch testing was calculated as a function of tip position along the scratch. This was accomplished by applying a load varying between 50 μN to 120 milli-Newton (mN) in a controlled fashion while measuring the force required to move the tip laterally across the scratch length of 500 μm.

Scratch recovery (% recovery) was calculated from the penetration curves during and after the scratch using Eqn 2. The scratch depth was measured at 400 μm.

Nano Indentation Modulus and Nano Indentation Hardness ISO 14577 (2015): The mechanical properties of nano indentation modulus and hardness were evaluated using the Nano Indenter® XP (KLA Corporation, Milpitas, USA). The samples were further subjected to nano-indentation modulus and hardness test in accordance with the procedure set forth under ISO 14577. For the test, indentations were made at a constant strain rate of 0.05 $s^{-1}$. A hold-time of 20 seconds at peak load was used in all the measurements. In order to adjust the thermal drift, an additional hold for 100 sec at 90% of the unloading curve was applied before completing the unloading. The nano-indentation experiment was performed on the sample with 2000 nm (2 μm) indentation depth. On each sample, nine indents were made and the average results was reported.

Result: The results from the test are provided below:

TABLE 3

| Test results | | | |
|---|---|---|---|
| | IE (Inventive) | CE1 (Comparative) | CE2 (Comparative) |
| Total Scratch Depth (nm) measured at 48 mN | 2401.0 | 2938.0 | 3708.0 |
| Pile up Height (nm) measured at 48 mN | 496.0 | 601.0 | 822.0 |
| Percentage of recovery at 400 μm | 76% | 66% | 60% |
| Coefficient of friction (COF) | 2.5 | 3.5 | 4.5 |

TABLE 3-continued

| Test results | | | |
|---|---|---|---|
| | IE (Inventive) | CE1 (Comparative) | CE2 (Comparative) |
| Nano-indentation Modulus (MPa) (Indentation depth at 2000 nm) | 764.0 | 845.0 | 660.0 |
| Nano-indentation Hardness (MPa) (Indentation depth at 2000 nm) | 30.0 | 38.0 | 26.0 |

It is evident that the lower values of Total Scratch Depth, Pile Up Height, and Coefficient of Friction (COF), for the inventive sample (IE), as compared to the comparative samples CE1 and CE2, are indicative of the improved anti-scratch property of the inventive polypropylene sample (IE) over that of the comparative samples CE1 and CE2. From the values of nano-indentation hardness and nano-indentation modulus, it is evident that the inventive sample (IE) has improved mechanical properties over that of the sample CE2 having no anti-scratch additive. Further, the inventors found that the inventive polypropylene sample (IE) having a suitable poly(siloxane-carbonate) block copolymer as an anti-scratch additive, demonstrated improved anti-scratch performance while retaining the desired mechanical properties compared to the sample CE1, even though CE1 contains an anti-scratch additive in the form of a siloxane masterbatch additive.

Therefore, it may be concluded that the inventive polypropylene composition (IE) having a unique combination of propylene polymer, an elastomeric ethylene alpha-olefin co-polymer and a poly(siloxane-carbonate) block copolymer, imparts a desired balance of anti-scratch and mechanical properties as intended for various industrial applications.

What is claimed is:

1. A polypropylene composition, comprising:

≥50.0 wt. % and ≤90.0 wt. % of a propylene polymer;

≥5.0 wt. % and ≤30.0 wt. % of an elastomeric ethylene alpha-olefin co-polymer; and ≥0.1 wt. % and ≤20.0 wt. % of a poly(siloxane-carbonate) block copolymer, wherein the poly(siloxane-carbonate) block copolymer has a siloxane content of ≥55.0 wt % and ≤95.0 wt %, with regard to the total weight of the poly(siloxane-carbonate) block copolymer, with regard to the total weight of the polypropylene composition.

2. The polypropylene composition according to claim 1, wherein the propylene polymer is selected from the group consisting of a propylene homopolymer, a heterophasic propylene copolymer, a blend of at least two different heterophasic propylene copolymer, a grafted propylene polymer, a propylene copolymer comprising units derived from propylene and one or more units derived from ethylene and/or alpha-olefin(s) having 4-12 carbon atoms, and combinations thereof.

3. The polypropylene composition according to claim 1, wherein the propylene polymer is a blend of two different heterophasic propylene copolymer, wherein the blend comprises a first heterophasic propylene copolymer having a first melt flow rate ($MFR_A$) and a second heterophasic propylene copolymer having a second melt flow rate ($MFR_B$), wherein each of the first melt flow rate ($MFR_A$) and the second melt flow rate ($MFR_B$) is determined in accordance with ISO 1133 (2.16 kg and 230° C.), and wherein $MFR_A$>$MFR_B$.

4. The polypropylene composition according to claim 3, wherein the poly(siloxane-carbonate) block copolymer has a siloxane content of 60.0 wt. %, with regard to the total weight of the poly(siloxane-carbonate) block copolymer.

5. The polypropylene composition according to claim 1, wherein the elastomeric ethylene alpha-olefin co-polymer comprises (i) polymeric units derived from ethylene; and (ii) ≥5.0 wt. % and ≤50.0 wt. % of polymeric units derived from one or more alpha-olefins having 3-12 carbon atoms, with regard to the total weight of the elastomeric ethylene alpha-olefin co-polymer, wherein the alpha-olefins are selected from propylene, 1-butene, 1-hexene, 4-methyl-1-pentene, 1-octene, or combinations thereof.

6. The polypropylene composition according to claim 1, wherein the elastomeric ethylene alpha-olefin co-polymer has at least one of:

a melt flow rate (MFR) ≥0.5 g/10 min and ≤25.0 g/10 min, as determined at 190° C. at 2.16 kg load in accordance with ASTM D1238 (2013); or density≥850 kg/$m^3$ and ≤910 kg/$m^3$, as determined in accordance with ASTM D792 (2008).

7. The polypropylene composition according to claim 1, wherein the polypropylene composition further comprises one or more filler additives, wherein the one or more filler additives is present in an amount of ≥0.1 wt. % and ≤30.0 wt. %, with regard to the total weight of the polypropylene composition.

8. The polypropylene composition according to claim 7, wherein the one or more filler additives is selected from the group consisting of talc, anti-oxidants, UV stabilizers, color masterbatches and combinations thereof.

9. The polypropylene composition according to claim 1, wherein the polypropylene composition comprises:

≥50.0 wt. % and ≤90.0 wt. % of the propylene polymer, wherein the propylene polymer is a blend of at least two different heterophasic propylene copolymer;

≥5.0 wt. % and ≤30.0 wt. % of the elastomeric ethylene alpha-olefin co-polymer;

≥0.1 wt. % and ≤20.0 wt. % of the poly(siloxane-carbonate) block copolymer; and

≥0.1 wt. % and ≤30.0 wt. % of one or more filler additives;

with regard to the total weight of the polypropylene composition.

10. The polypropylene composition according to claim 1, wherein the polypropylene composition comprises:

≥50.0 wt. % and ≤90.0 wt. % of the propylene polymer, wherein the propylene polymer is a blend of two different heterophasic propylene copolymer comprising a first heterophasic propylene copolymer having a first melt flow rate ($MFR_A$) and a second heterophasic propylene copolymer having a second melt flow rate ($MFR_B$), wherein each of the melt flow rate is determined in accordance with ISO 1133 (2.16 kg and 230° C.), and wherein $MFR_A$>$MFR_B$;

≥5.0 wt. % and ≤30.0 wt. % of the elastomeric ethylene alpha-olefin co-polymer, wherein the elastomeric ethylene alpha-olefin co-polymer comprises (i) polymeric units derived from ethylene; and (ii) ≥5.0 wt. % and ≤45.0 wt. % of polymeric units derived from one or more alpha-olefins having 3-12 carbon atoms, with regard to the total weight of the elastomeric ethylene alpha-olefin co-polymer;

≥0.1 wt. % and ≤20.0 wt. % of the poly(siloxane-carbonate) block; and

≥0.1 wt. % and ≤30.0 wt. % of one or more filler additives;

with regard to the total weight of the polypropylene composition.

11. The polypropylene composition according to claim 1, wherein the polypropylene composition has at least one of:

a scratch depth of ≤3000 nm when determined in accordance with ASTM D7127-20 using an increasing load ramping nano-scratch test at a load between ≥50 μN and ≤120 milli-Newton (mN) across a 500 μm scratch length and measured at 48 milli-Newton (mN);

a co-efficient of friction of ≤0.4 when determined in accordance with ASTM D7127-20 using an increasing load ramping nano-scratch test at a load between ≥50 μN and ≤120 milli-Newton (mN) across a 500 μm scratch length and at a tip velocity of 10.0 μm/s using a three-sided pyramidal Berkovich diamond indenter having a diameter of 0.05 μm; or a percentage recovery of ≥70.0%, measured at a scratch depth of 400 μm, when determined in accordance with ASTM D7127-20 using an increasing load ramping nano-scratch test at a load between ≥50 μN and ≤120 milli-Newton (mN) across a 500 μm scratch length and at a tip velocity of 10.0 μm/s using a three-sided pyramidal Berkovich diamond indenter having a diameter of 0.05 μm.

12. A process for preparing the polypropylene composition of claim 1, wherein the process comprises the steps of:

providing to an extruder a set of ingredients comprising a propylene polymer, an elastomeric ethylene alpha-olefin co-polymer, a poly(siloxane-carbonate) block copolymer, and optionally one or more filler additives; and extruding the set of ingredients at an extrusion temperature of ≥75° C. and ≤350° C., and forming the polypropylene composition.

13. An article comprising the polypropylene composition according to claim 1.

14. A process for preparing the article of claim 13, wherein the process comprises:

providing the polypropylene composition according to claim 13; and molding the polypropylene composition under conditions suitable for injection molding and forming the article.

15. A process comprising utilizing the polypropylene composition according to claim 1 for improving the scratch resistance property of an article.

16. The article of claim 13, wherein the article is an automotive component.

17. The polypropylene composition of claim 1, wherein the poly(siloxane-carbonate) block copolymer has a siloxane content of ≥55.0 wt. % and ≤75.0 wt. %, with regard to the total weight of the poly(siloxane-carbonate) block copolymer.

18. The polypropylene composition of claim 1, wherein the poly(siloxane-carbonate) block copolymer has a siloxane content of ≥55.0 wt. % and ≤65.0 wt. %, with regard to the total weight of the poly(siloxane-carbonate) block copolymer.

19. The polypropylene composition according to claim 1, wherein the elastomeric ethylene alpha-olefin co-polymer comprises (i) polymeric units derived from ethylene; and (ii) ≥5.0 wt. % and <40.0 wt. % of polymeric units derived from one or more alpha-olefins having 3-12 carbon atoms, with regard to the total weight of the elastomeric ethylene alpha-olefin co-polymer, wherein the alpha-olefins are selected from propylene, 1-butene, 1-hexene, 4-methyl-1-pentene, 1-octene, or combinations thereof.

20. The polypropylene composition according to claim 19, wherein the alpha-olefin is selected from 1-butene, 1-hexene or 1-octene.

* * * * *